W. M. BOWLES.
TOOL FOR FORMING CHARCOAL MOLD SECTIONS.
APPLICATION FILED MAR. 12, 1915.
1,182,136.
Patented May 9, 1916.
2 SHEETS—SHEET 1.
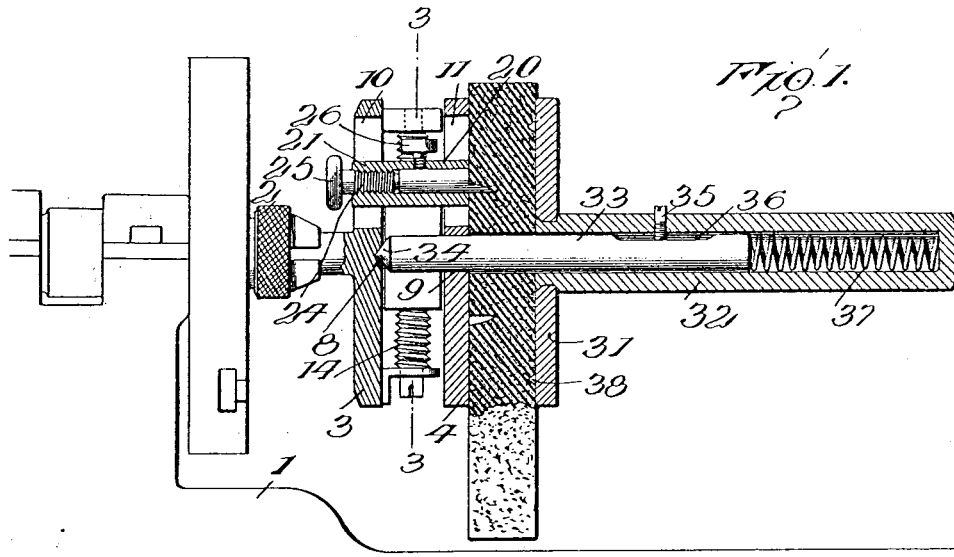
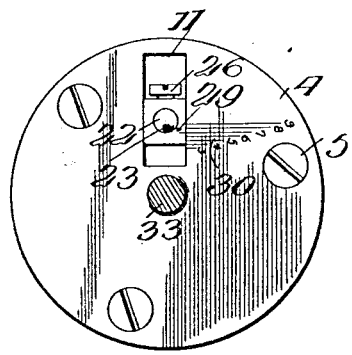
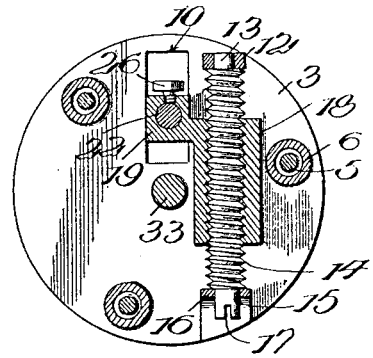
Witnesses
Inventor
W. M. Bowles
By _____, Attorneys

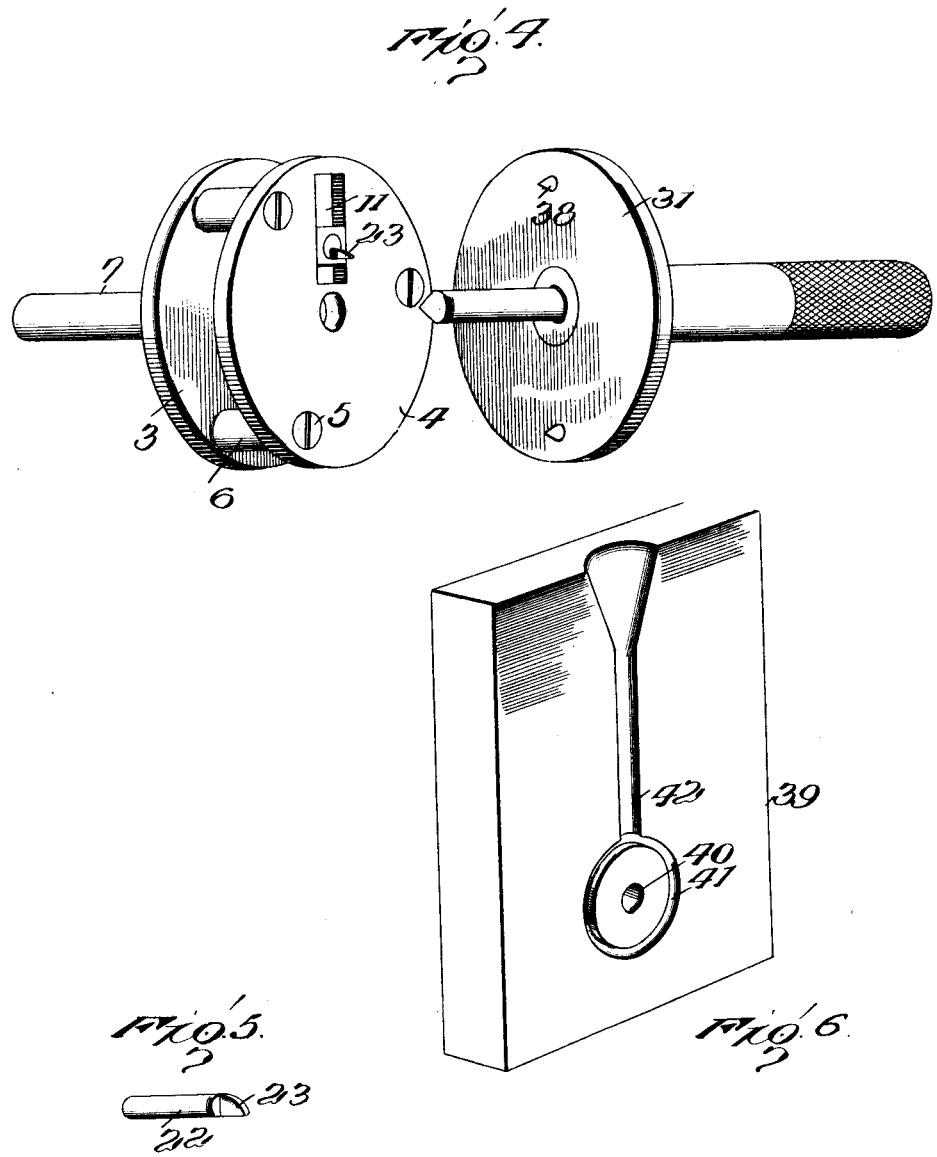

UNITED STATES PATENT OFFICE.

WILLIAM M. BOWLES, OF SHAWNEE, OKLAHOMA.

TOOL FOR FORMING CHARCOAL MOLD-SECTIONS.

1,182,136.  Specification of Letters Patent.  Patented May 9, 1916.

Application filed March 12, 1915. Serial No. 14,025.

*To all whom it may concern:*

Be it known that I, WILLIAM M. BOWLES, a citizen of the United States, residing at Shawnee, in the county of Pottawatomie and State of Oklahoma, have invented certain new and useful Improvements in Tools for Forming Charcoal Mold-Sections, of which the following is a specification.

This invention relates to tools for forming jewelers' charcoal mold sections, and more particularly such mold sections as are employed in the manufacture of finger rings.

It is one aim of the invention to provide a tool of the class mentioned so constructed that mold sections may be formed for use in the manufacture of rings of various sizes and of any desired style or cross sectional contour.

Another aim of the invention is to so construct the tool that two mold sections formed thereby will be exactly of counterpart structure so that the finger ring cast in the mold will be of uniform contour and will not require any considerable finishing, which would be liable to result in waste of the metal.

Another aim of the invention is to provide a tool of the class described so constructed that it may be readily and quickly adjusted for the formation of a mold in which a finger ring may be cast of any desired diameter, width, thickness and cross sectional contour.

In the accompanying drawings: Figure 1 is a vertical longitudinal sectional view through the tool embodying the present invention, the same being illustrated in use in the formation of a mold section. Fig. 2 is a front elevation of the cutter head of the tool. Fig. 3 is a vertical transverse sectional view on the line 3—3 of Fig. 1. Fig. 4 is a group perspective view illustrating the cutter head and the work supporting and feeding device. Fig. 5 is a perspective view of one of the mold sections in its completed condition. Fig. 6 is a perspective view of one form of bit to be used in connection with the cutter head.

Corresponding and like parts are referred to in the following description and indicated in all the views of the accompanying drawings by the same reference characters.

The tool embodying the present invention is designed primarily for use in connection with any ordinary jeweler's lathe, and a portion of such a lathe is shown in Fig. 1 of the drawings and indicated in general by the numeral 1, the chuck thereof being indicated by the numeral 2. The tool includes a cutter head including spaced circular plates, one indicated by the numeral 3 and the other by the numeral 4. These plates are disposed in axial alinement and connected by means of screws or other suitable fastening elements 5 and held in spaced relation by means of spacing sleeves or collars 6 fitted upon the said screws or, if desired, one of the plates may be provided with posts into which the screws 5 may be threaded, the said posts serving the same purpose as the spacing sleeves or collars. The plate 3 is provided axially upon that face opposite the face which is presented toward the plate 4, with a tang 7 which is to be fitted into and held by the chuck 2. For a purpose to be presently explained, the plate 3 is formed in its other face and axially with a tapered socket 8 and the plate 4 is formed with an opening 9 located in axial alinement with the socket 8. The plates 3 and 4 are further formed respectively with slots 10 and 11 and these slots are located opposite each other and extend radially with respect to the axes of the respective plates, the slots terminating at their inner ends slightly short of the socket 8 and opening 9 respectively and at their outer ends slightly short of the peripheries of the respective plates. The plate 3 is provided upon its forward face or, in other words, that face which is presented to the plate 3, with a bracket 12 into which is fitted the reduced end 13 of an adjusting screw 14, the other end of the screw being reduced, as at 15, and being rotatably fitted in a bearing 16, also mounted upon the said face of the plate 3. The last mentioned end of the adjusting screw is provided with a groove 17 into which may be fitted the end of a bit of a screw driver for the purpose of rotating the screw to secure an adjustment, the nature of which will be presently set forth.

The numeral 18 indicates a squared sleeve having a threaded bore receiving the adjusting screw 14. The sleeve 18 fits between the adjacent faces of the plates 3 and 4 and, by reason of its square cross sectional contour, it is held against rotation so that when the adjusting screw is turned in one direction or the other, the sleeve will be moved in one direction or the other between the plates 3 and 4.

By reference to Fig. 3 of the drawings, it will be observed that the adjusting screw 14 is located at one side of the socket 8 in the plate 3 and that consequently the axis of the adjusting screw is chordal to the circle described by the periphery of the plate. It will further be observed that the adjusting screw is parallel to the slot 10 and consequently, when the screw is turned, the sleeve 18 will be adjusted along a line parallel to the side walls of the slot 10. The sleeve 18 at that end next adjacent the slot 10 is provided with an offset right-angularly positioned socket 19 which is preferably rectangular in cross section and which has its ends projecting slidably into the slots 10 and 11. This socket 19 is provided with a bore, a portion 20 of which is cylindrical and another portion 21 threaded. The socket 19 is provided for the support of the cutting bits, one of which bits is clearly shown in Fig. 6 of the drawings and indicated by the numeral 22. Each of the several cutting bits employed in connection with the cutter head, includes a cylindrical body or shank which is fitted into the portion 20 of the bore of the socket 19 and may be rotatably and longitudinally adjusted therein, and the outer end of the shank or, in other words, that end which is next adjacent the corresponding end of the socket, is provided with a blade 23, the contour of which determines the cross sectional contour of the ring which is to be produced by the use of the mold. At this point it will be apparent that the shank of the bit 22 may be adjusted so as to permit the blade 23 to project a greater or less distance beyond the plane of the outer face of the plate 4, and the distance to which this blade projects will of course be determined by the width of the ring to be molded, and in order that the bit may be fed outwardly in the bore of the socket 19 so as to cause its blade to project a greater or less distance beyond the face of the plate 4, an adjusting screw 24 is threaded into the portion 21 of the bore of the socket and bears at its end against the inner end of the shank of the said bit, this screw being provided with a milled head 25 to permit of its ready adjustment. In order that the pin may be held in its adjusted position and against rotation within the bore of the socket 19 a set screw 26 is threaded through one wall of the socket and bears against the side of the said bit. That end of the socket 19 into which the bit is fitted preferably is flush with the outer face of the plate 4 and is provided with a pointer or indicator mark 27 designed, in the radial adjustment of the socket, to register with one or another of a series of scale marks 30 upon the said face of the plate 4, depending upon the size of the ring to be cast in the mold. It will be observed that the scale mark or pointer 9 is located directly opposite the inner edge of the knife of the bit and that the scale marks 30 have associated with them suitable numerals indicating the different sizes of finger rings.

In connection with the cutter heads, above described, there is provided a work supporting and feeding device which includes a plate 31 which is preferably circular in form and axially mounted at one end of a tubular hand piece 32. A centering pin 33 is slidably mounted in the bore of the hand piece 32 and this centering pin is of a diameter to be snugly and yet rotatably received within the opening 9 and is provided with a conical end 34 which is to seat in the socket 8 in the manner clearly shown in Fig. 1 of the drawing. The pin 33 is held against rotation and its longitudinal movement in the hand piece 32 is limited by a threaded pin or screw 35 fitted through one side of the hand piece and projecting into a groove 36 formed in one side of the said pin 33. A spring 37 is arranged within the hand piece 32 and bears at one end against the closed end of the hand piece and at its other end against the inner end of the centering pin 33, this spring serving to normally project the pin beyond the face of the plate 31. The said face of the plate is provided with a number of spurs 38, the purpose of which will be presently explained.

The tool is used in the following manner: Two blocks of charcoal, one of which is clearly shown in Figs. 1 and 6 of the drawings and indicated by the numeral 39, are selected, and these blocks are to constitute the sections of the mold to be formed by the tool. The blocks have plane faces and are preferably rectangular and in the initial preparation of each block, before its formation by the tool, a suitable hand reamer (not shown) is employed for the purpose of boring a hole 40 extending completely through the block near one end thereof and as near as possible to the longitudinal middle of the block. After this hole has been bored in the block, the centering pin 33 is fitted through the hole and the plate 31 is pressed against one face of the block until the spurs 38 enter the material thereof. The cutter head having been properly assembled with the lathe and the bit thereof having been properly adjusted, the work supporting and feeding device heretofore described and upon which the block is now supported, is so disposed with relation to the cutter head that the centering pin 33 will fit through the opening 9 and engage at its conical end in the socket 8. As the cutter head rotates, the hand piece 32 is moved gradually toward the plate 4 of the cutter head against the tension of the spring 37 for the purpose of feeding the block of charcoal to the blade of the cutter bit, and during this feeding operation the blade of the bit will cut an annular groove in the face of the charcoal block concentric to the axis of the opening 40, this groove being indicated at 41 in Fig. 5 of the drawings. The feeding operation is continued until the face of the block has been brought into contact with the face of the plate 4, at which time, the blade of the bit will have cut into the block to a depth equal to the distance to which it projects beyond the face of the said plate 4. When the two blocks have been thus treated and have had channels 42 cut in their faces leading from one end to the groove 41, the blocks are assembled and a pin (not shown) is fitted through the registering openings 40 in the blocks. The mold is then ready for use and the molten metal may be poured into the passage formed by the matching channels 42 through which it will flow into the matching grooves 41 and will assume a shape corresponding to the contour of the walls of the said grooves 41.

Having thus described the invention, what is claimed as new is:

1. In a tool of the class described, a rotatable cutter head having a central socket, and a work supporting and feeding device including a head having a spring projected centering pin removably fitted in the socket of the cutter head, the said work supporting head being longitudinally movable upon the centering pin in one direction against the tension of the spring.

2. In a tool of the class described, a rotatable cutter head including spaced portions, an adjusting screw mounted between the portions for rotation, a sleeve fitting the adjusting screw and adjustable through rotation of the screw, a working member carried by the head and adjustable therewith in a direction radially with respect to the axis of the head, and a bit carried by the working member and projecting beyond the working face of the said cutter head.

3. In a tool of the class described, a cutter head including spaced portions, an adjusting screw rotatably mounted between the said portions, a member adjustable through rotation of the said adjusting screw, one of the said spaced portions of the cutter head being provided with a radial slot and the said member having an offset portion working in the slot and adjustable with the said member and arranged for the support of a bit.

In testimony whereof I affix my signature in presence of two witnesses.

WILLIAM M. BOWLES. [L. S.]

Witnesses:
LUELLA C. FERGUSON,
VERNON EASTERWOOD.

Copies of this patent may be obtained for five cents each, by addressing the "Commissioner of Patents, Washington, D. C."